United States Patent
Gao

(10) Patent No.: US 11,306,247 B2
(45) Date of Patent: Apr. 19, 2022

(54) BORATE FLUORESCENT POWDER AND PREPARING METHOD THEREOF

(71) Applicant: Wuhan China Star Optoelectronics Semiconductor Display Technology Co., Ltd., Wuhan (CN)

(72) Inventor: Yuan Gao, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 179 days.

(21) Appl. No.: 16/621,263

(22) PCT Filed: Nov. 1, 2018

(86) PCT No.: PCT/CN2018/113306
§ 371 (c)(1),
(2) Date: Dec. 11, 2019

(87) PCT Pub. No.: WO2020/015247
PCT Pub. Date: Jan. 23, 2020

(65) Prior Publication Data
US 2021/0301204 A1    Sep. 30, 2021

(30) Foreign Application Priority Data
Jul. 19, 2018   (CN) .......................... 201810796838.4

(51) Int. Cl.
*C09K 11/77*   (2006.01)
(52) U.S. Cl.
CPC ................................ *C09K 11/7797* (2013.01)

(58) Field of Classification Search
CPC .................................................... C09K 11/7797
See application file for complete search history.

(56) References Cited

FOREIGN PATENT DOCUMENTS

| CN | 106544021 | 3/2017 |
| CN | 107033896 | * 8/2017 |

OTHER PUBLICATIONS

Xiao et al, "An Efficient Green Phosphor of Ce3+ and Tb3+-copded Ba2Lu5B5O17 and a Model for Elucidating the THermal Stability of the Green Emission", J. Mater. Chem. C, 2018, 6, pp. 5984-5991, Apr. 30, 2018.*

Zhang et al, "Broadband-Excited and Efficient Blue/Green/Red-emitting Ba2Y5B5O17:Ce3+,Tb3+,Eu3+ Phosphor Using Tb3+-Bridged Ce3+—Eu3+ Energy Transfer", Dyes and Pigments, 149 (2018), pp. 696-706, Nov. 24, 2017.*

Zhang et al. "Photoluminescence and Energy Transfer of Ce3+, Tb3+, and Eu3+ Doped KBaY(BO3)2 as Near-Ultraviolet-Excited Color-Tunable Phopshors", Industrial and Engineering Chemistry Research, I&EC Research, 54(31): 7632-7639, Published Online Jul. 16, 2015.

* cited by examiner

*Primary Examiner* — C Melissa Koslow

(57) ABSTRACT

A borate fluorescent powder and a preparing method thereof are provided. The formula of the borate fluorescent powder is $Ba_{2-n}Sr_nLu_{5-x-y-m-z}L_mCe_xTb_yEu_zB_5O_{17}$. L is one or any combination of the elements Gd, La, and Sc. Ranges of x, y, z, m, and n are respectively $0<x\le0.6$, $0<y\le3$, $0<z\le0.4$, $0\le m\le1$, and $0\le n\le0.5$. The borate fluorescent powder provided has a stable crystalline phase, high luminous efficiency, and decent thermal stability, and can be applied to ultraviolet LEDs or near-ultraviolet LEDs to construct white LEDs.

16 Claims, 3 Drawing Sheets

BORATE FLUORESCENT POWDER AND PREPARING METHOD THEREOF

RELATED APPLICATIONS

This application is a National Phase of PCT Patent Application No. PCT/CN2018/113306 having International filing date of Nov. 1, 2018, which claims the benefit of priority of Chinese Patent Application No. 201810796838.4 filed on Jul. 19, 2018. The contents of the above applications are all incorporated by reference as if fully set forth herein in their entirety.

FIELD AND BACKGROUND OF THE INVENTION

The invention relates to a field in phosphor powder production, and in particular to a borate fluorescent powder and a preparing method thereof.

In the current mainstream of pursuing a low-carbon economy, white light emitting diodes (LEDs) are highly efficient, energy-saving, environmentally friendly, and durable, and become illumination sources for the new generation.

At present, fluorescent powder conversion technology is a main technology to realize white LEDs. There are two main methods of fluorescent powder conversion technology. One is to use blue LEDs to excite yellow fluorescent powder. Although the light conversion efficiency is high, the luminescence spectrum is mainly green and yellow, and the red is insufficient, causing low color rendering index of the constructed white LEDs. In addition, blue light is directly involved in the formation of white light, and blue light is harmful to human eyes. The other is to construct white LEDs by utilizing red, green, and blue fluorescent powders excited by ultraviolet or near-ultraviolet light. The color of white LEDs by this method is stable. The red fluorescent powder is crucial to construct white LEDs, but near-ultraviolet light is weakly absorbed when a 4f-4f transition occurs to $Eu^{3+}$ (positive trivalent europium ion) in conventional red fluorescent powder, causing low luminous efficiency.

In summary, when a 4f-4f transition occurs to $Eu^{3+}$ in conventional red fluorescent powder, near-ultraviolet light is weakly absorbed, causing low luminous efficiency. Hence, when the red fluorescent powder is combined with the green and blue fluorescent powders to construct white LEDs, colors thereof are unstable, and luminous efficiency thereof is low.

SUMMARY OF THE INVENTION

The present disclosure provides a borate fluorescent powder, solving the problem that conventional red fluorescent powder has low luminous efficiency.

In order to solve the above problem, the technical solution provided by the present disclosure is as follows:

A method for preparing a borate fluorescent powder of a formula: $Ba_{2-n}Sr_nLu_{5-x-y-m-z}L_mCe_xTb_yEu_zB_5O_{17}$ is provided in the present disclosure, wherein L is one or any combination of the elements Gd, La, and Sc; x, y, z, m, and n all are mole fractions; and ranges of x, y, z, m, and n respectively are $0.001<x\leq0.3$, $0.001<y\leq2$, $0.01<z\leq0.3$, $0\leq m\leq1$, and $0\leq n\leq0.5$, the method comprising steps of:

a step S10 of weighing stoichiometric amounts of the required raw materials of A, B, C, D, E, F, G, H, I, and J, and then mixing and grounding the required raw materials to obtain a first mixture, wherein the raw material of A is a compound including $Ba^{2+}$, the raw material of B is a compound including $Ce^{3+}$, the raw material of C is a compound including $Tb^{3+}$, the raw material of D is a compound including $Eu^{3+}$, the raw material of E is a compound including $B^{3+}$, the raw material of F is a compound of $Sr^{2+}$, the raw material of G is a compound including $La^{3+}$, the raw material of H is a compound including $Gd^{3+}$, the raw material of I is a compound including $Lu^{3+}$, and the raw material of J is a compound including $Sc^{3+}$;

a step S20 of performing a first heat treatment on the first mixture under a condition of reduction gas to obtain a second mixture; and a step S30 of performing a second heat treatment on the second mixture under the condition of reduction gas, and then cooling and grinding the second mixture to obtain the borate fluorescent powder of formula $Ba_{2-n}Sr_nLu_{5-x-y-m-z}L_mCe_xTb_yEu_zB_5O_{17}$, wherein the reduction gas is carbon monoxide or hydrogen.

In at least an embodiment of the present disclosure, a sum of mole numbers of $La^{3+}$ in the raw material of G, $Gd^{3+}$ in the raw material of H, and $Sc^{3+}$ in the raw material of J is a, a ratio of mole numbers of $Ba^{2+}$ in the raw material of A, $Sr^{2+}$ in the raw material of F, $Lu^{3+}$ in the raw material of I, $Ce^{3+}$ in the raw material of B, $Tb^{3+}$ in the raw material of C, $Eu^{3+}$ in the raw material of D, and $B^{3+}$ in the raw material of E with respect to the a is $Ba^{2+}:Sr^{2+}:Lu^{3+}:Ce^{3+}:Tb^{3+}:Eu^{3+}:B^{3+}:a = (2-n):n:(5-x-y-m-z):x:y:z:5:m$.

In at least an embodiment of the present disclosure, any one of the raw materials of A, B, C, D, F, G, H, I, and J can only include at most one of metal ions which are $Ba^{2+}$, $Sr^{2+}$, $Lu^{3+}$, $Ce^{3+}$, $Tb^{3+}$, $Eu^{3+}$, $La^{3+}$, $Gd^{3+}$, and $Sc^{3+}$.

In at least an embodiment of the present disclosure, any one of the raw materials of A, B, C, D, F, G, H, I, and J is one or any combination of carbonates, nitrates, and halides.

In at least an embodiment of the present disclosure, a temperature of the first heat treatment ranges from 350° C. to 600° C., and a duration of the first heat treatment ranges from 1 to 6 hours.

In at least an embodiment of the present disclosure, a temperature of the second heat treatment ranges from 1000° C. to 1300° C., and a duration of the second heat treatment ranges from 2 to 24 hours.

A borate fluorescent powder having a formula: $Ba_{2-n}Sr_nLu_{5-x-y-m-z}L_mCe_xTb_yEu_zB_5O_{17}$ is further provided in the present disclosure, wherein L is one or any combination of the elements Gd, La, and Sc; x, y, z, m, and n are all mole fractions; and ranges of x, y, z, m, and n are respectively $0<x\leq0.6$, $0<y\leq3$, $0<z\leq0.4$, $0\leq m\leq1$, and $0\leq n\leq0.5$.

In at least an embodiment of the present disclosure, ranges of x, y, and z respectively are $0.001<x\leq0.3$, $0.001<y\leq2$, and $0.01<z\leq0.3$.

Another method for preparing a borate fluorescent powder of a formula: $Ba_{2-n}Sr_nLu_{5-x-y-m-z}L_mCe_xTb_yEu_zB_5O_{17}$ is provided in the present disclosure, wherein L is one or any combination of the elements Gd, La, and Sc; x, y, z, m, and n all are mole fractions; and ranges of x, y, z, m, and n respectively are $0<x\leq0.6$, $0<y\leq3$, $0<z\leq0.4$, $0\leq m\leq1$, and $0\leq n\leq0.5$, the method comprising steps of:

a step S10 of weighing stoichiometric amounts of the required raw materials of A, B, C, D, E, F, G, H, I, and J, and then mixing and grounding the required raw materials to obtain a first mixture, wherein the raw material of A is a compound including $Ba^{2+}$, the raw material of B is a compound including $Ce^{3+}$, the raw material of C is a compound including $Tb^{3+}$, the raw material of D is a compound including $Eu^{3+}$, the raw material of E is a compound including $B^{3+}$, the raw material of F is a compound of $Sr^{2+}$, the raw material of G is a compound including $La^{3+}$, the raw material of H is a compound including $Gd^{3+}$, the raw material of I is a compound including $Lu^{3+}$, and the raw material of J is a compound including $Sc^{3+}$;

a step S20 of performing a first heat treatment on the first mixture under a condition of reduction gas to obtain a second mixture; and a step S30 of performing a second heat treatment on the second mixture under the condition of reduction gas, and then cooling and grinding the second mixture to obtain the borate fluorescent powder of formula $Ba_{2-n}Sr_nLu_{5-x-y-m-z}L_mCe_xTb_yEu_zB_5O_{17}$.

In at least an embodiment of the present disclosure, the ranges of the raw materials of x, y, and z are respectively $0.001<x\leq0.3$, $0.001<y\leq2$, and $0.01<z\leq0.3$.

In at least an embodiment of the present disclosure, a sum of mole numbers of $La^{3+}$ in the raw material of G, $Gd^{3+}$ in the raw material of H, and $Sc^{3+}$ in the raw material of J is a, a ratio of mole numbers of $Ba^{2+}$ in the raw material of A, $Sr^{2+}$ in the raw material of F, $Lu^{3+}$ in the raw material of I, $Ce^{3+}$ in the raw material of B, $Tb^{3+}$ in the raw material of C, $Eu^{3+}$ in the raw material of D, and $B^{3+}$ in the raw material of E with respect to the a is $Ba^{2+}:Sr^{2+}:Lu^{3+}:Ce^{3+}:Tb^{3+}:Eu^{3+}:B^{3+}:a=(2-n):n:(5-x-y-m-z):x:y:z:5:m$.

In at least an embodiment of the present disclosure, any one of the raw materials of A, B, C, D, F, G, H, I, and J can only include at most one of metal ions which are $Ba^{2+}$, $Sr^{2+}$, $Lu^{3+}$, $Ce^{3+}$, $Tb^{3+}$, $Eu^{3+}$, $La^{3+}$, $Gd^{3+}$, and $Sc^{3+}$.

In at least an embodiment of the present disclosure, any one of the raw materials of A, B, C, D, F, G, H, I, and J is one or any combination of carbonates, nitrates, and halides.

In at least an embodiment of the present disclosure, the reduction gas is carbon monoxide or hydrogen.

In at least an embodiment of the present disclosure, a temperature of the first heat treatment ranges from 350° C. to 600° C., and a duration of the first heat treatment ranges from 1 to 6 hours.

In at least an embodiment of the present disclosure, a temperature of the second heat treatment ranges from 1000° C. to 1300° C., and a duration of the second heat treatment ranges from 2 to 24 hours.

The present disclosure has the beneficial effects: the borate fluorescent powders co-doped with cerium, terbium and europium provided by the present disclosure have stable crystalline phase, high luminous efficiency and decent thermal stability, and may be applied to ultraviolet LEDs or near-ultraviolet LEDs to construct white LEDs. In addition, the method for preparing a borate fluorescent powder provided by the present disclosure has the advantages of simple manufacturing processes, easy operation and no contamination.

BRIEF DESCRIPTION OF THE SEVERAL VIEWS OF THE DRAWINGS

In order to more clearly illustrate the embodiments of the present invention or the technical solutions in prior arts, the following briefly introduces the accompanying drawings used in the embodiments. Obviously, the drawings in the following description merely show some of the embodiments of the present invention. As regards one of ordinary skill in the art, other drawings can be obtained in accordance with these accompanying drawings without making creative efforts.

DESCRIPTION OF SPECIFIC EMBODIMENTS OF THE INVENTION

The following description of the embodiments with reference to the accompanying drawings is used to illustrate particular embodiments of the present disclosure. The directional terms referred in the present disclosure, such as "upper", "lower", "front", "back", "left", "right", "inner", "outer", "side surface", etc. are only directions with regard to the accompanying drawings. Therefore, the directional terms used for describing and illustrating the present disclosure are not intended to limit the present disclosure.

The present disclosure aims at resolving the technical problem of conventional red fluorescent powder. When a 4f-4f transition occurs to $Eu^{3+}$ in conventional red fluorescent powder, the near-ultraviolet light is weakly absorbed, causing low luminous efficiency. Hence, when the red fluorescent powder is combined with the green and blue fluorescent powders to construct white LEDs, colors thereof are unstable, and luminous efficiency thereof is low. The present disclosure resolves the defects.

First Embodiment

Figure 1:
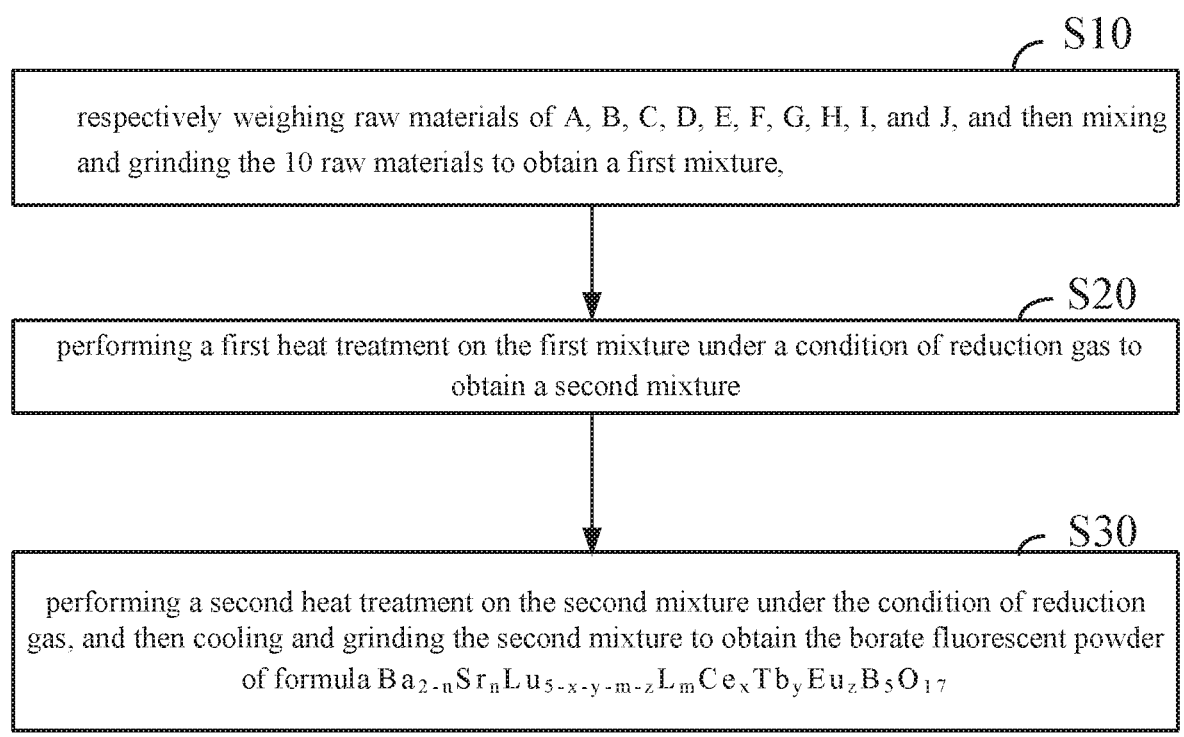
FIG. 1 is a step flow chart of a preparing method in accordance with a first embodiment of the present disclosure.

As shown in FIG. 1, a formula of the fluorescent powder provided in the present embodiment is $Ba_2Lu_{2.85}Ce_{0.05}Tb_2Eu_{0.1}B_5O_{17}$. The preparing method thereof includes the following steps:

In Step S10, stoichiometric amounts of the required raw materials of A, B, C, D, E, F, G, H, I, and J are weighed, mixed, and ground to obtain a first mixture.

The raw material of A is $BaCO_3$ (barium carbonate), the raw material of B is $CeO_2$ (cerium oxide), the raw material of C is $Tb_4O_7$ (terbium oxide), the raw material of D is $Eu_2O_3$ (europium (III) oxide), the raw material of E is $H_3BO_3$ (boric acid), the raw material of F is $SrCO_3$ (strontium carbonate), the raw material of G is $La_2O_3$ (lanthanum oxide), the raw material of H is $Gd_2O_3$ (gadolinium oxide), the raw material of I is $Lu_2O_3$ (lutetium oxide), and the raw material of J is $Sc_2O_3$ (scandium oxide). The purity of the $BaCO_3$ and $SrCO_3$ is 99.7% or more, the purity of the $H_3BO_3$ is 99.8% or more, the purity of the $CeO_2$, $Tb_4O_7$, $La_2O_3$, $Lu_2O_3$, $Sc_2O_3$, $Gd_2O_3$, and $Eu_2O_3$ is 99% or more.

The raw materials are formulated in accordance with the stoichiometric ratio of the elements included in the formula. The molar fraction of each element in the formula of the present embodiment is Ba:Lu:Ce:Tb:Eu:B=2:2.85:0.05:2:0.1:5.

The formula does not include elements of Sr, Gd, La, and Sc. The molar fraction ratio of the $BaCO_3$, $Lu_2O_3$, $CeO_2$, $Tb_4O_7$, $Eu_2O_3$, $H_3BO_3$ is 2:1.425:0.05:0.5:0.05:5. The mass of $H_3BO_3$ is weighed to 0.3092 g, and other raw materials are weighed in accordance with the molar fraction ratios, as shown in Table 1.

TABLE 1

| | Raw Material | | | | | | | | | |
|---|---|---|---|---|---|---|---|---|---|---|
| | A | B | C | D | E | F | G | H | I | J |
| Formula | $BaCO_3$ | $CeO_2$ | $Tb_4O_7$ | $Eu_2O_3$ | $H_3BO_3$ | $SrCO_3$ | $La_2O_3$ | $Gd_2O_3$ | $Lu_2O_3$ | $Sc_2O_3$ |
| Mass/g | 0.3947 | 0.0086 | 0.3738 | 0.0176 | 0.3092 | 0 | 0 | 0 | 0.5671 | 0 |

Then, the raw material of A, the raw material of B, the raw material of C, the raw material of D, the raw material of E, and the raw material of I are placed in an agate mortar for grinding, and after mixed homogeneously, a first mixture is obtained. The first mixture is placed in a corundum crucible, and then the corundum crucible is capped.

In a step S20, a first heat treatment is performed on the first mixture under a condition of reduction gas to obtain a second mixture.

The step S20 includes the following steps:

In a step S201, a high temperature furnace is vacuumed, and then CO gas is filled in the furnace. The purpose of vacuuming is to prevent air and moisture in the high temperature furnace from affecting a reaction, and the purpose of filling CO gas is to provide a reduction condition for the reaction, so that the reactants undergo a redox reaction with the CO.

In a Step S202, the corundum crucible is placed in the high temperature furnace filled with CO gas, and the first sintering is performed at 450° C. to obtain the second mixture, and the duration of the first sintering is 4 hours.

In a step S30, a second heat treatment is performed on the second mixture under the condition of reduction gas, and then the second mixture is cooled and grinded to obtain the fluorescent powder of formula $Ba_2Lu_{2.85}Ce_{0.05}Tb_2Eu_{0.1}B_5O_{17}$.

Specifically, in the high temperature furnace, the temperature is raised to 1200° C., and the temperature is kept constant, and the second mixture is continuously sintered for a second time, the duration of the second sintering is 10 hours. After the mixture cools down naturally, appropriate grinding is performed to obtain the fluorescent powder.

The sintering is a high temperature solid phase reaction process, which converts a powdery material into a dense object.

Figure 2:
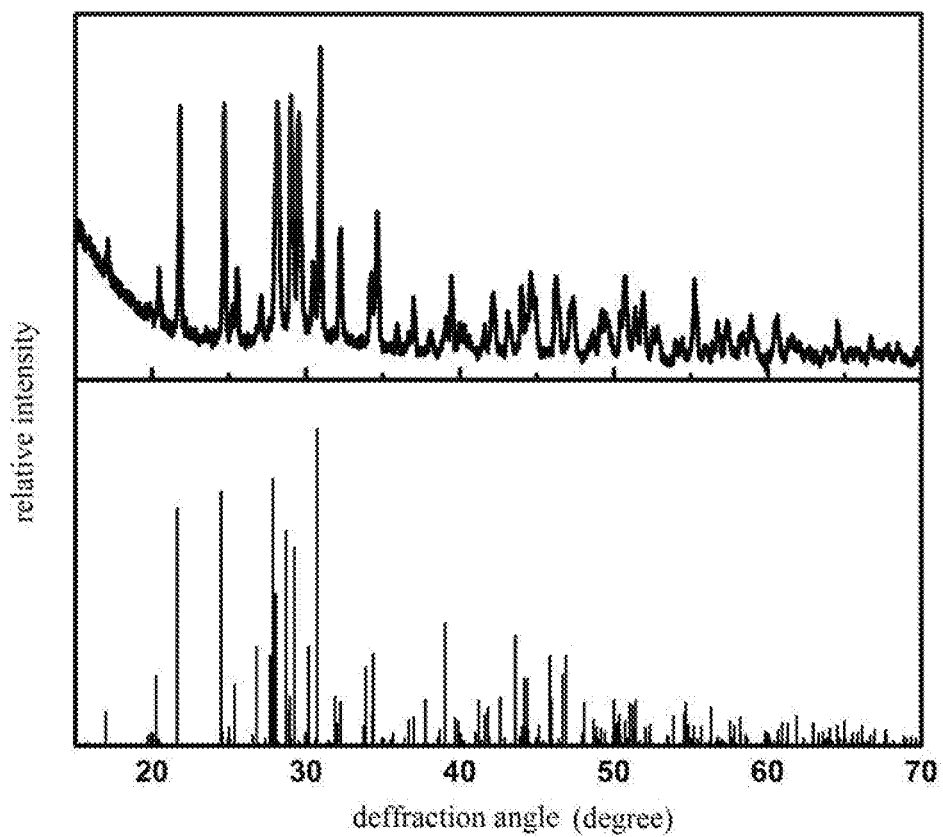
FIG. 2 is an x-ray diffraction spectrum of a fluorescent powder in accordance with the first embodiment of the present disclosure.

Refer to FIG. 2, which is a comparison diagram of an x-ray diffraction spectrum of the fluorescent powder with an x-ray diffraction spectrum of a standard substance in accordance with the present embodiment. Wherein, the x-ray diffraction spectrum of the fluorescent powder is located on top of the x-ray diffraction spectrum of the standard substance. It is seen from the figure that the peak positions of the diffraction spectrum (upper panel) of the fluorescent powder prepared in this embodiment is almost identical to the control peak positions of the diffraction spectrum (lower panel) of the standard substance. Only few heterophases are present, and the peak shapes are sharp, indicating that the product obtained from the high temperature solid phase reaction method employed in the present embodiment has high purity.

Figure 3:
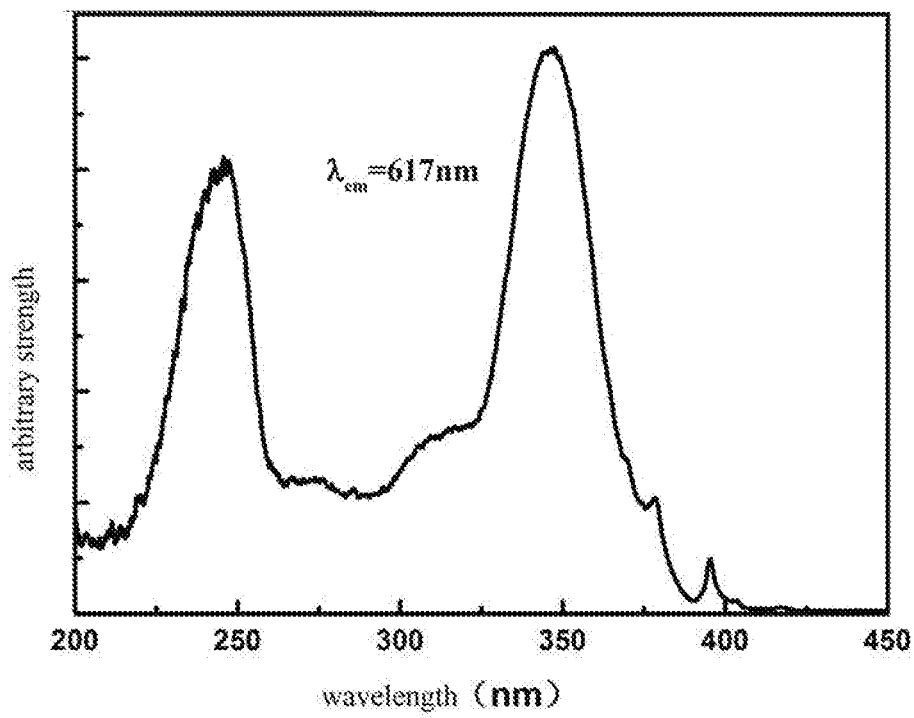
FIG. 3 is an excitation spectrum diagram of a fluorescent powder in accordance with the first embodiment of the present disclosure.

Refer to FIG. 3, which is an excitation spectrum diagram of a fluorescent powder in accordance with the preferred embodiment. It is seen from the figure that the fluorescent powder has a high luminous intensity under the excitation of excitation light of 230-380 nm.

Figure 4:
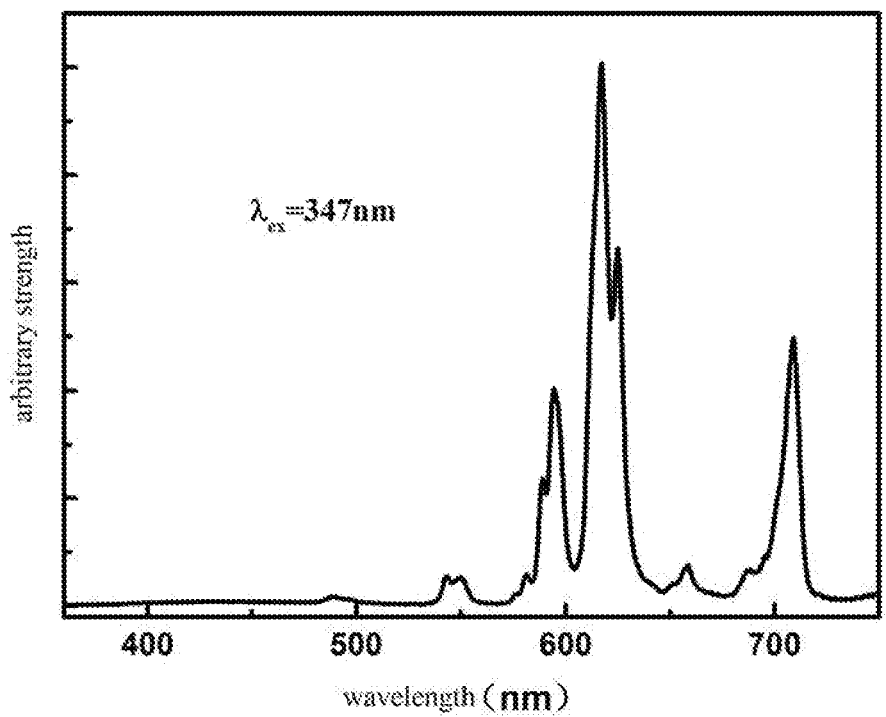
FIG. 4 is an emission spectrum diagram of a fluorescent powder in accordance with the first embodiment of the present disclosure.

Refer to FIG. 4, which is an emission spectrum diagram of a fluorescent powder in accordance with the embodiment. It is seen from the figure that the peak wavelength of the fluorescent powder is 617 nm under excitation light of 347 nm.

In the preparing method provided by the present embodiment, under the excitation of 230-380 nm excitation light, the red emission with the main peak at 617 nm is achieved, and the color purity is high.

Second Embodiment

A formula of the fluorescent powder provided in the present embodiment is $Ba_2Lu_{4.898}Ce_{0.001}Tb_{0.001}Eu_{0.1}B_5O_{17}$. The preparing method thereof includes the following steps:

In Step S10, stoichiometric amounts of the required raw materials of A, B, C, D, E, F, G, H, I, and J are weighed, mixed and then ground to obtain a first mixture.

The raw material of A is $BaCO_3$ (barium carbonate), the raw material of B is $CeO_2$ (cerium oxide), the raw material of C is $Tb_4O_7$ (terbium oxide), and the raw material of D is $Eu_2O_3$ (europium (III) oxide), the raw material of E is $H_3BO_3$ (boric acid), the raw material of F is $SrCO_3$ (strontium carbonate), the raw material of G is $La_2O_3$ (lanthanum oxide), the raw material of H is $Gd_2O_3$ (gadolinium oxide), the raw material of I is $Lu_2O_3$ (lutetium oxide), and the raw material of J is $Sc_2O_3$ (scandium oxide). The purity of the $BaCO_3$ and $SrCO_3$ is 99.7% or more, the purity of the $H_3BO_3$ is 99.8% or more, the purity of $CeO_2$, $Tb_4O_7$, $La_2O_3$, $Lu_2O_3$, $Sc_2O_3$, $Gd_2O_3$ and $Eu_2O_3$ is 99% or more.

The raw materials are formulated in accordance with the stoichiometric ratio of the elements included in the formula. The molar fraction of each element in the formula of the present embodiment is Ba:Lu:Ce:Tb:Eu:B=2:4.898:0.001:0.001:0.1:5. The formula does not include elements of Sr, Gd, La and Sc. The molar fraction ratio of the $BaCO_3$, $Lu_2O_3$, $CeO_2$, $Tb_4O_7$, $Eu_2O_3$, $H_3BO_3$ is 2:2.449:0.001:0.00025:0.05:5. The mass of $H_3BO_3$ is weighed to 0.3092 g, and other raw materials are weighed in accordance with the molar fraction ratios, as shown in Table 2.

TABLE 2

| | Raw Material | | | | | | | | | |
|---|---|---|---|---|---|---|---|---|---|---|
| | A | B | C | D | E | F | G | H | I | J |
| Formula | $BaC_3$ | $CeO_2$ | $Tb_4O_7$ | $Eu_2O_3$ | $H_3BO_3$ | $SrCO_3$ | $La_2O_3$ | $Gd_2O_3$ | $Lu_2O_3$ | $Sc_2O_3$ |
| Mass/g | 0.3947 | 0.0002 | 0.0002 | 0.0176 | 0.3092 | 0 | 0 | 0 | 0.9745 | 0 |

Then, the raw material of A, the raw material of B, the raw material of C, the raw material of D, the raw material of E, and the raw material of I are placed in an agate mortar for grinding, and after mixed homogeneously, a first mixture is obtained. The first mixture is placed in a corundum crucible, and then the corundum crucible is capped.

In a step S20, a first heat treatment is performed on the first mixture under a condition of reduction gas to obtain a second mixture.

The step S20 includes the following steps:

In a step S201, a high temperature furnace is vacuumed, and then CO gas is filled in the furnace. The purpose of vacuuming is to prevent air and moisture in the high temperature furnace from affecting a reaction, and the purpose of filling CO gas is to provide a reduction condition for the reaction, so that the reactants undergo a redox reaction with the CO.

In a Step S202, the corundum crucible is placed in the high temperature furnace filled with CO gas, and the first sintering is performed at 480° C. to obtain the second mixture, and the duration of the first sintering is 4 hours.

In a step S30, a second heat treatment is performed on the second mixture under the condition of reduction gas, and then the second mixture is cooled and grinded to obtain the fluorescent powder of formula $Ba_2Lu_{4.898}Ce_{0.001}Tb_{0.001}Eu_{0.1}B_5O_{17}$.

Specifically, in the high temperature furnace, the temperature is raised to 1200° C., and the temperature is kept constant, and the second mixture is continuously sintered for a second time, the duration of the second sintering is 10 hours. After the mixture cools down naturally, appropriate grinding is performed to obtain the fluorescent powder.

The sintering is a high temperature solid phase reaction process, which converts a powdery material into a dense object.

The x-ray diffraction spectrum, the excitation spectrum, and the emission spectrum of the fluorescent powder of the present preferred embodiment are similar to those of the first embodiment, but the emission luminous intensity of the $Ce^{3+}$ and $Tb^{3+}$ in the red light region of the present embodiment is weaker than that of the first embodiment.

Third Embodiment

A formula of the fluorescent powder provided in the present embodiment is $Ba_{1.5}Sr_{0.5}Lu_{4.898}Ce_{0.001}Tb_{0.001}Eu_{0.1}B_5O_{17}$. The preparing method thereof includes the following steps:

In Step S10, stoichiometric amounts of the required raw materials of A, B, C, D, E, F, G, H, I, and J are weighed, mixed and then ground to obtain a first mixture.

The raw material of A is $BaCO_3$ (barium carbonate), the raw material of B is $CeO_2$ (cerium oxide), the raw material of C is $Tb_4O_7$ (terbium oxide), the raw material of D is $Eu_2O_3$ (europium (III) oxide), the raw material of E is $H_3BO_3$ (boric acid), the raw material of F is $SrCO_3$ (strontium carbonate), the raw material of G is $La_2O_3$ (lanthanum oxide), the raw material of H is $Gd_2O_3$ (gadolinium oxide), the raw material of I is $Lu_2O_3$ (lutetium oxide), and the raw material of J is $Sc_2O_3$ (scandium oxide). The purity of the $BaCO_3$ and $SrCO_3$ is 99.7% or more, the purity of the $H_3BO_3$ is 99.8% or more, the purity of the $CeO_2$, $Tb_4O_7$, $La_2O_3$, $Lu_2O_3$, $Sc_2O_3$, $Gd_2O_3$ and $Eu_2O_3$ is 99% or more.

The raw materials are formulated in accordance with the stoichiometric ratio of the elements included in the formula. The molar fraction of each element in the formula of the present embodiment is Ba:Sr:Lu:Ce:Tb:Eu:B=1.5:0.5:4.898:0.001:0.001:0.1:5. The formula does not include elements of Gd, La and Sc. The molar fraction ratio of the $BaCO_3$, $SrCO_3$, $Lu_2O_3$, $CeO_2$, $Tb_4O_7$, $Eu_2O_3$, $H_3BO_3$ is 1.5:0.5:2.449:0.001:0.00025:0.05:5. The mass of $H_3BO_3$ is weighed to 0.3092 g, and other raw materials are weighed in accordance with the molar fraction ratios, as shown in Table 3.

TABLE 3

| | Raw Material | | | | | | | | | |
|---|---|---|---|---|---|---|---|---|---|---|
| | A | B | C | D | E | F | G | H | I | J |
| Formula | $BaCO_3$ | $CeO_2$ | $Tb_4O_7$ | $Eu_2O_3$ | $H_3BO_3$ | $SrCO_3$ | $La_2O_3$ | $Gd_2O_3$ | $Lu_2O_3$ | $Sc_2O_3$ |
| Mass/g | 0.2960 | 0.0002 | 0.0002 | 0.0176 | 0.3092 | 0.0738 | 0 | 0 | 0.9745 | 0 |

Then, the raw material of A, the raw material of B, the raw material of C, the raw material of D, the raw material of E, the raw material of F, and the raw material of I are placed in an agate mortar for grinding, and after mixed and homogeneously, a first mixture is obtained. The first mixture is placed in a corundum crucible, and then the corundum crucible is capped.

In a step S20, a first heat treatment is performed on the first mixture under a condition of reduction gas to obtain a second mixture.

The step S20 includes the following steps:

In a step S201, a high temperature furnace is vacuumed, and then CO gas is filled in the furnace. The purpose of vacuuming is to prevent air and moisture in the high temperature furnace from affecting a reaction, and the purpose of filling CO gas is to provide a reduction condition for the reaction, so that the reactants undergo a redox reaction with the CO.

In a Step S202, the corundum crucible is placed in the high temperature furnace filled with CO gas, and the first sintering is performed at 460° C. to obtain the second mixture, and the duration of the first sintering is 4 hours.

In a step S30, a second heat treatment is performed on the second mixture under the condition of reduction gas, and then the second mixture is cooled and grinded to obtain the fluorescent powder of formula $Ba_{1.5}Sr_{0.5}Lu_{4.898}Ce_{0.001}Tb_{0.001}Eu_{0.1}B_5O_{17}$.

Specifically, in the high temperature furnace, the temperature is raised to 1200° C., and the temperature is kept constant, and the second mixture is continuously sintered for a second time, the duration of the second sintering is 8 hours. After the mixture cools down naturally, appropriate grinding is performed to obtain the fluorescent powder.

The sintering is a high temperature solid phase reaction process, which converts a powdery material into a dense object.

The x-ray diffraction spectrum, the excitation spectrum, and the emission spectrum of the fluorescent powder of the present preferred embodiment are similar to those of the first embodiment, but the emission luminous intensity of the $Ce^{3+}$ and $Tb^{3+}$ in the red light region of the present embodiment is weaker than that of the first embodiment.

Forth Embodiment

A formula of the fluorescent powder provided in the present embodiment is $Ba_2Lu_{1.85}La_{1.0}Ce_{0.05}Tb_2Eu_{0.1}B_5O_{17}$. The preparing method thereof includes the following steps:

In Step S10, stoichiometric amounts of the required raw materials of A, B, C, D, E, F, G, H, I, and J are weighed, mixed and then ground to obtain a first mixture.

The raw material of A is $BaCO_3$ (barium carbonate), the raw material of B is $CeO_2$ (cerium oxide), the raw material of C is $Tb_4O_7$ (terbium oxide), the raw material of D is $Eu_2O_3$ (europium (III) oxide), the raw material of E is $H_3BO_3$ (boric acid), the raw material of F is $SrCO_3$ (strontium carbonate), the raw material of G is $La_2O_3$ (lanthanum oxide), the raw material of H is $Gd_2O_3$ (gadolinium oxide), the raw material of I is $Lu_2O_3$ (lutetium oxide), and the raw material of J is $Sc_2O_3$ (scandium oxide). The purity of the $BaCO_3$ and $SrCO_3$ is 99.7% or more, the purity of the $H_3BO_3$ is 99.8% or more, the purity of the $CeO_2$, $Tb_4O_7$, $La_2O_3$, $Lu_2O_3$, $Sc_2O_3$, $Gd_2O_3$ and $Eu_2O_3$ is 99% or more.

The raw materials are formulated in accordance with the stoichiometric ratio of the elements included in the formula. The molar fraction of each element in the formula of the present embodiment is Ba:Lu:La:Ce:Tb:Eu:B=2:1.85:1.0: 0.05:2:0.1:5. The formula does not include elements of Sr, Gd and Sc. The molar fraction ratio of the $BaCO_3$, $Lu_2O_3$, $La_2O_3$, $CeO_2$, $Tb_4O_7$, $Eu_2O_3$, $H_3BO_3$ is 2:0.925:0.5:0.05: 0.5:0.05:5. The mass of $H_3BO_3$ is weighed to 0.3092 g, and other raw materials are weighed in accordance with the molar fraction ratios, as shown in Table 4.

TABLE 4

| | Raw Material | | | | | | | | | |
|---|---|---|---|---|---|---|---|---|---|---|
| | A | B | C | D | E | F | G | H | I | J |
| Formula | $BaCO_3$ | $CeO_2$ | $Tb_4O_7$ | $Eu_2O_3$ | $H_3BO_3$ | $SrCO_3$ | $La_2O_3$ | $Gd_2O_3$ | $Lu_2O_3$ | $Sc_2O_3$ |
| Mass/g | 0.3947 | 0.0086 | 0.3738 | 0.0176 | 0.3092 | 0 | 0.1629 | 0 | 0.3681 | 0 |

Then, the raw material of A, the raw material of B, the raw material of C, the raw material of D, the raw material of E, the raw material of G, and the raw material of I are placed in an agate mortar for grinding, and after mixed and homogeneously, a first mixture is obtained. The first mixture is placed in a corundum crucible, and then the corundum crucible is capped.

In a step S20, a first heat treatment is performed on the first mixture under a condition of reduction gas to obtain a second mixture.

The step S20 includes the following steps:

In a step S201, a high temperature furnace is vacuumed, and then CO gas is filled in the furnace. The purpose of vacuuming is to prevent air and moisture in the high temperature furnace from affecting a reaction, and the purpose of filling CO gas is to provide a reduction condition for the reaction, so that the reactants undergo a redox reaction with the CO.

In a Step S202, the corundum crucible is placed in the high temperature furnace filled with CO gas, and the first sintering is performed at 450° C. to obtain the second mixture, and the duration of the first sintering is 4 hours.

In a step S30, a second heat treatment is performed on the second mixture under the condition of reduction gas, and then the second mixture is cooled and grinded to obtain the fluorescent powder of formula $Ba_2L_{1.85}La_{1.0}Ce_{0.05}Tb_2Eu_{0.1}B_5O_{17}$.

Specifically, in the high temperature furnace, the temperature is raised to 1190° C., and the temperature is kept constant, and the second mixture is continuously sintered for a second time, the duration of the second sintering is 14 hours. After the mixture cools down naturally, appropriate grinding is performed to obtain the fluorescent powder.

The sintering is a high temperature solid phase reaction process, which converts a powdery material into a dense object.

The x-ray diffraction spectrum, the excitation spectrum, and the emission spectrum of the fluorescent powder of the present preferred embodiment are similar to those of the first embodiment, but the emission luminous intensity of the $Ce^{3+}$ and $Tb^{3+}$ in the red light region of the present embodiment is weaker than that of the first embodiment.

Fifth Embodiment

A formula of the fluorescent powder provided in the present embodiment is: $Ba_2Lu_{1.85}La_{1.0}Ce_{0.05}Tb_2Eu_{0.1}B_5O_{17}$. The preparing method thereof includes the following steps:

In Step S10, stoichiometric amounts of the required raw materials of A, B, C, D, E, F, G, H, I, and J are weighed, mixed and the ground to obtain a first mixture.

The raw material of A is $BaCO_3$ (barium carbonate), the raw material of B is $CeO_2$ (cerium oxide), the raw material of C is $Tb_4O_7$ (terbium oxide), the raw material of D is $Eu_2O_3$ (europium (III) oxide), the raw material of E is $H_3BO_3$ (boric acid), the raw material of F is $SrCO_3$ (strontium carbonate), the raw material of G is $La_2O_3$ (lanthanum oxide), the raw material of H is $Gd_2O_3$ (gadolinium oxide), the raw material of I is $Lu_2O_3$ (lutetium oxide), and the raw material of J is $Sc_2O_3$ (scandium oxide). The purity of the $BaCO_3$ and $SrCO_3$ is 99.7% or more, the purity of $H_3BO_3$ is 99.8% or more, the purity of the $CeO_2$, $Tb_4O_7$, $La_2O_3$, $Lu_2O_3$, $Sc_2O_3$, $Gd_2O_3$ and $Eu_2O_3$ is 99% or more.

The raw materials are formulated in accordance with the stoichiometric ratio of the elements included in the formula. The molar fraction of each element in the formula of the present embodiment is Ba:Lu:Gd:Ce:Tb:Eu:B=2:1.85:1.0: 0.05:2:0.1:5. The formula does not include elements of Sr, La and Sc. The molar fraction ratio of the $BaCO_3$, $Lu_2O_3$, $Gd_2O_3$, $CeO_2$, $Tb_4O_7$, $Eu_2O_3$, $H_3BO_3$ is 2:0.925:0.5:0.05: 0.5:0.05:5. The mass of $H_3BO_3$ is weighed to 0.3092 g, and other raw materials are weighed in accordance with the molar fraction ratios, as shown in Table 5.

TABLE 5

| | Raw Material | | | | | | | | | |
|---|---|---|---|---|---|---|---|---|---|---|
| | A | B | C | D | E | F | G | H | I | J |
| Formula | $BaCO_3$ | $CeO_2$ | $Tb_4O_7$ | $Eu_2O_3$ | $H_3BO_3$ | $SrCO_3$ | $La_2O_3$ | $Gd_2O_3$ | $Lu_2O_3$ | $Sc_2O_3$ |
| Mass/g | 0.3947 | 0.0086 | 0.3738 | 0.0176 | 0.3092 | 0 | 0 | 0.1813 | 0.3681 | 0 |

Then, the raw material of A, the raw material of B, the raw material of C, the raw material of D, the raw material of E, the raw material of H, and the raw material of I are placed in an agate mortar for grinding, and after mixed and homogeneously, a first mixture is obtained. The first mixture is placed in a corundum crucible, and then the corundum crucible is capped.

In a step S20, a first heat treatment is performed on the first mixture under a condition of reduction gas to obtain a second mixture.

The step S20 includes the following steps:

In a step S201, a high temperature furnace is vacuumed, and then CO gas is filled in the furnace. The purpose of vacuuming is to prevent air and moisture in the high temperature furnace from affecting the reaction, and the purpose of filling CO gas is to provide a reduction condition for a reaction, so that the reactants undergo a redox reaction with the CO.

In a Step S202, the corundum crucible is placed in the high temperature furnace filled with CO gas, and the first sintering is performed at 450° C. to obtain the second mixture, and the duration of the first sintering is 4 hours.

In a step S30, a second heat treatment is performed on the second mixture under the condition of reduction gas, and then the second mixture is cooled and grinded to obtain the fluorescent powder of formula $Ba_2Lu_{1.85}La_{1.0}Ce_{0.05}Tb_2Eu_{0.1}B_5O_{17}$.

Specifically, in the high temperature furnace, the temperature is raised to 1200° C., and the temperature is kept constant, and the second mixture is continuously sintered for a second time, the duration of the second sintering is 10 hours. After the mixture cools down naturally, appropriate grinding is performed to obtain the fluorescent powder.

The sintering is a high temperature solid phase reaction process, which converts a powdery material into a dense object.

The x-ray diffraction spectrum, the excitation spectrum, and the emission spectrum of the fluorescent powder of the present preferred embodiment are similar to those of the first embodiment, but the emission luminous intensity of the $Ce^{3+}$ and $Tb^{3+}$ in the red light region of the present embodiment is weaker than that of the first embodiment.

Sixth Embodiment

A formula of the fluorescent powder is provided in the present embodiment is $Ba_2Lu_{1.35}Gd_{1.5}Ce_{0.05}Tb_2Eu_{0.1}B_5O_{17}$. The preparing method thereof includes the following steps:

In Step S10, stoichiometric amounts of the required raw materials of A, B, C, D, E, F, G, H, I, and J are weighed, mixed and then ground to obtain a first mixture.

The raw material of A is $BaCO_3$ (barium carbonate), the raw material of B is $CeO_2$ (cerium oxide), the raw material of C is $Tb_4O_7$ (terbium oxide), the raw material of D is $Eu_2O_3$ (europium (III) oxide), the raw material of E is $H_3BO_3$ (boric acid), the raw material of F is $SrCO_3$ (strontium carbonate), the raw material of G is $La_2O_3$ (lanthanum oxide), the raw material of H is $Gd_2O_3$ (gadolinium oxide), the raw material of I is $Lu_2O_3$ (lutetium oxide), and the raw material of J is $Sc_2O_3$ (scandium oxide). The purity of the $BaCO_3$ and $SrCO_3$ is 99.7% or more, the purity of the $H_3BO_3$ is 99.8% or more, the purity of the $CeO_2$, $Tb_4O_7$, $La_2O_3$, $Lu_2O_3$, $Sc_2O_3$, $Gd_2O_3$ and $Eu_2O_3$ is 99% or more.

The raw materials are formulated in accordance with the stoichiometric ratio of the elements included in the formula. The molar fraction of each element in the formula of the present embodiment is Ba:Lu:Gd:Ce:Tb:Eu:B=2:1.35:1.5:0.05:2:0.1:5. The formula does not include elements of Sr, La and Sc. The molar fraction ratio of the $BaCO_3$, $Lu_2O_3$, $Gd_2O_3$, $CeO_2$, $Tb_4O_7$, $Eu_2O_3$, $H_3BO_3$ is 2:0.675:0.75:0.05:0.5:0.05:5. The mass of $H_3BO_3$ is weighed to 0.3092 g, and other raw materials are weighed in accordance with the molar fraction ratios, as shown in Table 6.

TABLE 6

| | Raw Material | | | | | | | | | |
|---|---|---|---|---|---|---|---|---|---|---|
| | A | B | C | D | E | F | G | H | I | J |
| Formula | $BaCO_3$ | $CeO_2$ | $Tb_4O_7$ | $Eu_2O_3$ | $H_3BO_3$ | $SrCO_3$ | $La_2O_3$ | $Gd_2O_3$ | $Lu_2O_3$ | $Sc_2O_3$ |
| Mass/g | 0.3947 | 0.0086 | 0.3738 | 0.0176 | 0.3092 | 0 | 0 | 0.2719 | 0.2687 | 0 |

Then, the raw material of A, the raw material of B, the raw material of C, the raw material of D, the raw material of E, the raw material of H, and the raw material of I are placed in an agate mortar for grinding, and after mixed and homogeneously, a first mixture is obtained. The first mixture is placed in a corundum crucible, and then the corundum crucible is capped.

In a step S20, a first heat treatment is performed on the first mixture under a condition of reduction gas to obtain a second mixture.

The step S20 includes the following steps:

In a step S201, a high temperature furnace is vacuumed, and then CO gas is filled in the furnace. The purpose of vacuuming is to prevent air and moisture in the high temperature furnace from affecting areaction, and the purpose of filling CO gas is to provide a reduction condition for the reaction, so that the reactants undergo a redox reaction with the CO.

In a Step S202, the corundum crucible is placed in the high temperature furnace filled with CO gas, and the first sintering is performed at 450° C. to obtain the second mixture, and the duration of the first sintering is 5 hour.

In a step S30, a second heat treatment is performed on the second mixture under the condition of reduction gas, and then the second mixture is cooled and grinded to obtain the fluorescent powder of formula $Ba_2Lu_{0.35}Gd_{1.5}Ce_{0.05}Tb_2Eu_{0.1}B_5O_{17}$.

Specifically, in the high temperature furnace, the temperature is raised to 1250° C., and the temperature is kept constant, and the second mixture is continuously sintered for a second time, the duration of the second sintering is 10 hours. After the mixture cools down naturally, appropriate grinding is performed to obtain the fluorescent powder.

The sintering is a high temperature solid phase reaction process, which converts a powdery material into a dense object.

The x-ray diffraction spectrum, the excitation spectrum, and the emission spectrum of the fluorescent powder of the present preferred embodiment are similar to those of the first embodiment, but the emission luminous intensity of the $Ce^{3+}$ and $Tb^{3+}$ in the red light region of the present embodiment is weaker than that of the first embodiment.

Seventh Embodiment

A formula of the fluorescent powder provided in the present embodiment is $Ba_2Lu_{1.85}Sc_{1.0}Ce_{0.05}Tb_2Eu_{0.1}B_5O_{17}$. The preparing method thereof includes the following steps:

In Step S10, stoichiometric amounts of the required raw materials of A, B, C, D, E, F, G, H, I, and J are weighed, mixed and then ground to obtain a first mixture.

The raw material of A is $BaCO_3$ (barium carbonate), the raw material of B is $CeO_2$ (cerium oxide), the raw material of C is $Tb_4O_7$ (terbium oxide), the raw material of D is $Eu_2O_3$ (europium (III) oxide), the raw material of E is $H_3BO_3$ (boric acid), the raw material of F is $SrCO_3$ (strontium carbonate), the raw material of G is $La_2O_3$ (lanthanum oxide), the raw material of H is $Gd_2O_3$ (gadolinium oxide), the raw material of I is $Lu_2O_3$ (lutetium oxide), and the raw material of J is $Sc_2O_3$ (scandium oxide). The purity of the $BaCO_3$ and $SrCO_3$ is 99.7% or more, the purity of the $H_3BO_3$ is 99.8% or more, the purity of the $CeO_2$, $Tb_4O_7$, $La_2O_3$, $Lu_2O_3$, $Sc_2O_3$, $Gd_2O_3$ and $Eu_2O_3$ is 99% or more.

The raw materials are formulated in accordance with the stoichiometric ratio of the elements included in the formula. The molar fraction of each element in the formula of the present embodiment is Ba:Lu:Sc:Ce:Tb:Eu:B=2:1.85:1.0:0.05:2:0.1:5. The formula does not include elements of Sr, La and Gd. The molar fraction ratio of the $BaCO_3$, $Lu_2O_3$, $Sc_2O_3$, $CeO_2$, $Tb_4O_7$, $Eu_2O_3$, $H_3BO_3$ is 2:0.925:0.5:0.05:0.5:0.05:5. The mass of $H_3BO_3$ is weighed to 0.3092 g, and other raw materials are weighed in accordance with the molar fraction ratios, as shown in Table 7.

Then, the raw material of A, the raw material of B, the raw material of C, the raw material of D, the raw material of E, the raw material of I and the raw material of J are placed in an agate mortar for grinding, and after mixed homogeneously, a first mixture is obtained. The first mixture is placed in a corundum crucible, and then the corundum crucible is capped.

In a step S20, a first heat treatment is performed on the first mixture under a condition of reduction gas to obtain a second mixture.

The step S20 includes the following steps:

In a step S201, a high temperature furnace is vacuumed, and then CO gas is filled in the furnace. The purpose of vacuuming is to prevent air and moisture in the high temperature furnace from affecting a reaction, and the purpose of filling CO gas is to provide a reduction condition for the reaction, so that the reactants undergo a redox reaction with the CO.

In a Step S202, the corundum crucible is placed in the high temperature furnace filled with CO gas, and the first sintering is performed at 450° C. to obtain the second mixture, and the duration of the first sintering is 4 hours.

In a step S30, a second heat treatment is performed on the second mixture under the condition of reduction gas, and then the second mixture is cooled and grinded to obtain the fluorescent powder of formula $Ba_2Lu_{1.85}Sc_{1.0}Ce_{0.05}Tb_2Eu_{0.1}B_5O_{17}$.

Specifically, in the high temperature furnace, the temperature is raised to 1200° C., and the temperature is kept constant, and the second mixture is continuously sintered for a second time, the duration of the second sintering is 24 hours. After the mixture cools down naturally, appropriate grinding is performed to obtain the fluorescent powder.

The sintering is a high temperature solid phase reaction process, which converts a powdery material into a dense object.

The x-ray diffraction spectrum, the excitation spectrum, and the emission spectrum of the fluorescent powder of the present preferred embodiment are similar to those of the first embodiment, but the emission luminous intensity of the $Ce^{3+}$ and $Tb^{3+}$ in the red light region of the present embodiment is weaker than that of the first embodiment.

Eighth Embodiment

A formula of the fluorescent powder provided in the present embodiment is $Ba_2Lu_1Ce_{0.6}Tb_3Eu_{0.4}B_5O_{17}$. The preparing method thereof includes the following steps:

In Step S10, stoichiometric amounts of the required raw materials of A, B, C, D, E, F, G, H, I, and J are weighed, mixed and then ground to obtain a first mixture.

The raw material of A is $BaCO_3$ (barium carbonate), the raw material of B is $CeO_2$ (cerium oxide), the raw material of C is $Tb_4O_7$ (terbium oxide), the raw material of D is $Eu_2O_3$ (europium (III) oxide), the raw material of E is $H_3BO_3$ (boric acid), the raw material of F is $SrCO_3$ (strontium carbonate), the raw material of G is $La_2O_3$ (lanthanum oxide), the raw material of H is $Gd_2O_3$ (gadolinium oxide), the raw material of I is $Lu_2O_3$ (lutetium oxide), and the raw material of J is $Sc_2O_3$ (scandium oxide). The purity of the $BaCO_3$ and $SrCO_3$ is 99.7% or more, the purity of the

TABLE 7

| | Raw Material | | | | | | | | | |
|---|---|---|---|---|---|---|---|---|---|---|
| | A | B | C | D | E | F | G | H | I | J |
| Formula | $BaCO_3$ | $CeO_2$ | $Tb_4O_7$ | $Eu_2O_3$ | $H_3BO_3$ | $SrCO_3$ | $La_2O_3$ | $Gd_2O_3$ | $Lu_2O_3$ | $Sc_2O_3$ |
| Mass/g | 0.3947 | 0.0086 | 0.3738 | 0.0176 | 0.3092 | 0 | 0 | 0 | 0.3681 | 0.0689 |

$H_3BO_3$ is 99.8% or more, the purity of the $CeO_2$, $Tb_4O_7$, $La_2O_3$, $Lu_2O_3$, $Sc_2O_3$, $Gd_2O_3$ and $Eu_2O_3$ is 99% or more.

The raw materials are formulated in accordance with the stoichiometric ratio of the elements included in the formula. The molar fraction of each element in the formula of the present embodiment is Ba:Lu:C:Tb:Eu:B=2:1:0.6:3:0.4:5. The formula does not include elements of Sr, La and Gd. The molar fraction ratio of the $BaCO_3$, $Lu_2O_3$, $CeO_2$, $Tb_4O_7$, $Eu_2O_3$, $H_3BO_3$ is 2:0.5:0.6:0.75:0.2:5. The mass of $H_3BO_3$ is weighed to 0.3092 g, and other raw materials are weighed in accordance with the molar fraction ratios, as shown in Table 8.

TABLE 8

| | Raw Material | | | | | | | | | |
|---|---|---|---|---|---|---|---|---|---|---|
| | A | B | C | D | E | F | G | H | I | J |
| Formula | $BaCO_3$ | $CeO_2$ | $Tb_4O_7$ | $Eu_2O_3$ | $H_3BO_3$ | $SrCO_3$ | $La_2O_3$ | $Gd_2O_3$ | $Lu_2O_3$ | $Sc_2O_3$ |
| Mass/g | 0.3947 | 0.1033 | 0.5608 | 0.0704 | 0.3092 | 0 | 0 | 0 | 0.1990 | 0 |

Then, the raw material of A, the raw material of B, the raw material of C, the raw material of D, and the raw material of I are placed in an agate mortar for grinding, and after mixed homogeneously, a first mixture is obtained. The first mixture is placed in a corundum crucible, and then the corundum crucible is capped.

In a step S20, a first heat treatment is performed on the first mixture under a condition of reduction gas to obtain a second mixture.

The step S20 includes the following steps:

In a step S201, a high temperature furnace is vacuumed, and then CO gas is filled in the furnace. The purpose of vacuuming is to prevent air and moisture in the high temperature furnace from affecting a reaction, and the purpose of filling CO gas is to provide a reduction condition for the reaction, so that the reactants undergo a redox reaction with the CO.

In a Step S202, the corundum crucible is placed in the high temperature furnace filled with CO gas, and the first sintering is performed at 500° C. to obtain the second mixture, and the duration of the first sintering is 3 hours.

In a step S30, a second heat treatment is performed on the second mixture under the condition of reduction gas, and then the second mixture is cooled and grinded to obtain the fluorescent powder of formula $Ba_2Lu_1Ce_{0.6}Tb_3Eu_{0.4}B_5O_{17}$.

Specifically, in the high temperature furnace, the temperature is raised to 1200° C., and the temperature is kept constant, and the second mixture is continuously sintered for a second time, the duration of the second sintering is 11 hours. After the mixture cools down naturally, appropriate grinding is performed to obtain the fluorescent powder.

The sintering is a high temperature solid phase reaction process, which converts a powdery material into a dense object.

The x-ray diffraction spectrum, the excitation spectrum, and the emission spectrum of the fluorescent powder of the present preferred embodiment are similar to those of the first embodiment, but the emission luminous intensity of the $Ce^{3+}$ and $Tb^{3+}$ in the red light region of the present embodiment is weaker than that of the first embodiment.

The beneficial effects: the borate fluorescent powder provided by the present disclosure has a stable crystalline phase, high luminous efficiency, and decent thermal stability, and can be applied to ultraviolet LEDs or near-ultraviolet LEDs to construct white LEDs. In addition, the method for preparing a borate fluorescent powder provided by the present disclosure is simple in manufacturing, easy in operation, and has no contamination.

In summary, although the preferable embodiments of the present disclosure have been disclosed above, the embodiments are not intended to limit the present disclosure. A person of ordinary skill in the art, without departing from the spirit and scope of the present disclosure, can make various modifications and variations. Therefore, the scope of the disclosure is defined in the claims.

What is claimed is:

1. A method for preparing a borate fluorescent powder of a formula $Ba_{2-n}Sr_nLu_{5-x-y-m-z}L_mCe_xTb_yEu_zB_5O_{17}$, wherein L is one or any combination of the elements Gd, La, and Sc; x, y, z, m, and n all are mole fractions; and ranges of x, y, z, m, and n respectively are $0.001 < x \leq 0.3$, $0.001 < y \leq 2$, $0.01 < z \leq 0.3$, $0 \leq m \leq 1$, and $0 \leq n \leq 0.5$, the method comprising steps of:

a step S10 of weighing stoichiometric amounts of the required raw materials of A, B, C, D, E, F, G, H, I, and J, and then mixing and grinding the required raw materials to obtain a first mixture, wherein the raw material of A is a compound including $Ba^{2+}$, the raw material of B is a compound including $Ce^{3+}$, the raw material of C is a compound including $Tb^{3+}$, the raw material of D is a compound including $Eu^{3+}$, the raw material of E is a compound including $B^{3+}$, the raw material of F is a compound of $Sr^{2+}$, the raw material of G is a compound including $La^{3+}$, the raw material of H is a compound including $Gd^{3+}$, the raw material of I is a compound including $Lu^{3+}$, and the raw material of J is a compound including $Sc^{3+}$;

a step S20 of performing a first heat treatment on the first mixture under a condition of reduction gas to obtain a second mixture; and a step S30 of performing a second heat treatment on the second mixture under the condition of reduction gas, and then cooling and grinding the second mixture to obtain the borate fluorescent powder of formula $Ba_{2-n}Sr_nLu_{5-x-y-m-z}L_mCe_xTb_yEu_zB_5O_{17}$, wherein the reduction gas is carbon monoxide or hydrogen.

2. The preparing method as claimed in claim 1, wherein a sum of mole numbers of $La^{3+}$ in the raw material of G, $Gd^{3+}$ in the raw material of H, and $Sc^{3+}$ in the raw material of J is a, a ratio of mole numbers of $Ba^{2+}$ in the raw material of A, $Sr^{2+}$ in the raw material of F, $Lu^{3+}$ in the raw material of I, $Ce^{3+}$ in the raw material of B, $Tb^{3+}$ in the raw material of C, $Eu^{3+}$ in the raw material of D, and $B^{3+}$ in the raw material of E with respect to the a is $Ba^{2+}:Sr^{2+}:Lu^{3+}:Ce^{3+}:Tb^{3+}:Eu^{3+}:B^{3+}:a=$) 2-n:(n): 5-x-y-m-z:(x:y:z: 5:m.

3. The preparing method as claimed in claim 1, wherein the raw material of A is a compound including only one metal ion, which is $Ba^{2+}$; the raw material of B is a compound including only one metal ion, which is $Ce^{3+}$; the raw material of C is a compound including only one metal ion, which is $Tb^{3+}$; the raw material of D is a compound including only one metal ion, which is $Eu^{3+}$; the raw material of F is a compound including only one metal ion, which is $Sr^{2+}$; the raw material of G is a compound including only one metal ion, which is $La^{3+}$; the raw material of H is a compound including only one metal ion, which is $Gd^{3+}$; the raw material of I is a compound including only one metal ion, which is $Lu^{3+}$; and the raw material of J is a compound including only one metal ion, which is $Sc^{3+}$ any one of the raw materials of A, B, C, D, F, G, H, I, and J includes at most one type of $Ba^{2+}$, $Sr^{2+}$, $Lu^{3+}$, $Ce^{3+}$, $Tb^{3+}$, $Eu^{3+}$, $La^{3+}$, $Gd^{3+}$, and $Sc^{3+}$.

4. The preparing method as claimed in claim 3, wherein any one of the raw materials of A, B, C, D, F, G, H, I, and J is one or any combination of carbonates, nitrates, and halides.

5. The preparing method as claimed claim 1, wherein a temperature of the first heat treatment ranges from 350° C. to 600° C., and a duration of the first heat treatment ranges from 1 to 6 hours.

6. The preparing method as claimed in claim 1, wherein a temperature of the second heat treatment ranges from 1000° C. to 1300° C., and a duration of the second heat treatment ranges from 2 to 24 hours.

7. A borate fluorescent powder, having a formula of $$Ba_{2-n}Sr_nLu_{5-x-y-m-z}L_mCe_xTb_yEu_zB_5O_{17},$$

wherein L is one or any combination of the elements of Gd, La, and Sc; x, y, z, m, and n are all mole fractions; and ranges of x, y, z, m, and n are respectively $0<x\leq0.6$, $0<y\leq3$, $0<z\leq0.4$, $0\leq m\leq1$, and $0\leq n\leq0.5$.

8. The borate fluorescent powder as claimed in claim 7, wherein ranges of x, y, and z respectively are $0.001<x\leq0.3$, $0.001<y\leq2$, and $0.01<z\leq0.3$.

9. A method for preparing a borate fluorescent powder of a formula $Ba_{2-n}Sr_nLu_{5-x-y-m-z}L_mCe_xTb_yEu_zB_5O_{17}$, wherein L is one or any combination of the elements of Gd, La, and Sc; x, y, z, m, and n all are mole fractions; and ranges of x, y, z, m, and n respectively are $0<x\leq0.6$, $0<y\leq3$, $0<z\leq0.4$, $0\leq m\leq1$, and $0\leq n\leq0.5$, the method comprising steps of:

a step S10 of weighing stoichiometric amounts of the required raw materials of A, B, C, D, E, F, G, H, I, and J, and then mixing and grinding the required raw materials to obtain a first mixture, wherein the raw material of A is a compound including $Ba^{2+}$, the raw material of B is a compound including $Ce^{3+}$, the raw material of C is a compound including $Tb^{3+}$, the raw material of D is a compound including $Eu^{3+}$, the raw material of E is a compound including $B^{3+}$, the raw material of F is a compound of $Sr^{2+}$, the raw material of G is a compound including $La^{3+}$, the raw material of H is a compound including $Gd^{3+}$, the raw material of I is a compound including $Lu^{3+}$, and the raw material of J is a compound including $Sc^{3+}$;

a step S20 of performing a first heat treatment on the first mixture under a condition of reduction gas to obtain a second mixture; and a step S30 of performing a second heat treatment on the second mixture under the condition of reduction gas, and then cooling and grinding the second mixture to obtain the borate fluorescent powder of formula $Ba_{2-n}Sr_nLu_{5-x-y-m-z}L_mCe_xTb_yEu_zB_5O_{17}$.

10. The preparing method as claimed in claim 9, wherein the ranges of the raw materials of x, y, and z are respectively $0.001<x\leq0.3$, $0.001<y\leq2$, and $0.01<z\leq0.3$.

11. The preparing method as claimed in claim 9, wherein a sum of mole numbers of $La^{3+}$ in the raw material of G, $Gd^{3+}$ in the raw material of H, and $Sc^{3+}$ in the raw material of J is a, a ratio of mole numbers of $Ba^{2+}$ in the raw material of A, $Sr^{2+}$ in the raw material of F, $Lu^{3+}$ in the raw material of I, $Ce^{3+}$ in the raw material of B, $Tb^{3+}$ in the raw material of C, $Eu^{3+}$ in the raw material of D, and $B^{3+}$ in the raw material of E with respect to the a is $Ba^{2+}:Sr^{2+}:Lu^{3+}:Ce^{3+}:Tb^{3+}:Eu^{3+}:B^{3+}:a=)$ 2-n:(n): 5-x-y-m-z:(x:y:z: 5:m.

12. The preparing method as claimed in claim 9, wherein the raw material of A is a compound including only one metal ion, which is $Ba^{2+}$; the raw material of B is a compound including only one metal ion, which is $Ce^{3+}$; the raw material of C is a compound including only one metal ion, which is $Tb^{3+}$; the raw material of D is a compound including only one metal ion, which is $Eu^{3+}$; the raw material of F is a compound including only one metal ion, which is $Sr^{2+}$; the raw material of G is a compound including only one metal ion, which is $La^{3+}$; the raw material of H is a compound including only one metal ion, which is $Gd^{3+}$; the raw material of I is a compound including only one metal ion, which is $Lu^{3+}$; and the raw material of J is a compound including only one metal ion, which is $Sc^{3+}$ any one of the raw materials of A, B, C, D, F, G, H, I, and J includes at most one type of $Ba^{2+}$, $Sr^{2\pm'}$ $Lu^{3+}$, $Ce^{3+}$, $Tb^{3+}$, $Eu^{3+}$, $La^{3+}$, $Gd^{3+}$, and $Sc^{3+}$.

13. The preparing method as claimed in claim 12, wherein any one of the raw materials of A, B, C, D, F, G, H, I, and J is one or any combination of carbonates, nitrates, and halides.

14. The preparing method as claimed in claim 9, wherein the reduction gas is carbon monoxide or hydrogen.

15. The preparing method as claimed claim 9, wherein a temperature of the first heat treatment ranges from 350° C. to 600° C., and a duration of the first heat treatment ranges from 1 to 6 hours.

16. The preparing method as claimed claim 9, wherein a temperature of the second heat treatment ranges from 1000° C. to 1300° C., and a duration of the second heat treatment ranges from 2 to 24 hours.

* * * * *